United States Patent [19]
Yamada

[11] Patent Number: 5,455,820
[45] Date of Patent: Oct. 3, 1995

[54] OUTPUT-BUFFER SWITCH FOR ASYNCHRONOUS TRANSFER MODE

[75] Inventor: Kenji Yamada, Tokyo, Japan

[73] Assignee: NEC Corporation, Tokyo, Japan

[21] Appl. No.: 243,934

[22] Filed: May 18, 1994

[30] Foreign Application Priority Data

May 20, 1993 [JP] Japan .................................. 5-118503

[51] Int. Cl.$^6$ .................................................. H04L 12/56
[52] U.S. Cl. ............................ 370/17; 370/60.1; 370/61; 370/94.2
[58] Field of Search .................................. 370/13, 15, 16, 370/17, 53, 58.1, 58.2, 58.3, 60, 60.1, 61, 94.1, 94.2

[56] References Cited

U.S. PATENT DOCUMENTS

| | | | |
|---|---|---|---|
| 4,964,119 | 10/1990 | Endo et al. ................................ | 370/60 |
| 5,079,762 | 1/1992 | Tanabe ..................................... | 370/60 |
| 5,119,372 | 6/1992 | Verbeek .................................... | 370/60 |
| 5,126,999 | 6/1992 | Munter et al. ............................. | 370/60 |
| 5,128,931 | 7/1992 | Yamanaka et al. ........................ | 370/61 |
| 5,283,782 | 2/1994 | Takase et al. ............................. | 370/60 |

OTHER PUBLICATIONS

Suzuki et al., "Output-Buffer Switch Architecture for Asynchronous Transfer Mode", *International Journal of Digital and Analog Cabled Systems*, vol. 2, pp. 269–278 (1989).

Primary Examiner—Alpus Hsu
Attorney, Agent, or Firm—Foley & Lardner

[57] ABSTRACT

In an output-buffer switch for an asynchronous transfer mode, comprising a plurality of input buffer sections each for temporarily storing cells coming in through a respective input line, a time-division multiplexing section for time-division multiplexing the cells from the input buffer sections, and a plurality of output buffer sections each for temporarily storing the cells from the time-division multiplexing section which are meant for a respective output line, the output buffer sections each has a cell buffer, and a buffer occupancy ratio calculator which calculates an occupancy ratio of the cell buffer on the basis of the address information of the trailing and leading cells stored in the buffer. When the occupancy ratio exceeds a predetermined threshold, the calculator generates a buffer occupancy state signal. Each input buffer section has a buffer controller, an address filter, cell buffers, and a buffer selector. On receiving a buffer occupancy state signal from any output buffer section, the buffer controller controls the address filter, cell buffers and buffer selector such that cells addressed to the output buffer section, which is about to overflow, are temporarily stored in the cell buffer other than the cell buffer used when the buffer occupancy state signal is absent. These cells are fed out from the buffer when the occupancy ratio decreases to below the threshold. As a result, when any one of the output buffer sections overflows, it is recovered immediately without cells being discarded.

5 Claims, 6 Drawing Sheets

OUTPUT-BUFFER SWITCH FOR ASYNCHRONOUS TRANSFER MODE

BACKGROUND OF THE INVENTION

1. Field of the Invention

The present invention relates to an output-buffer switch for an asynchronous transfer mode (ATM) applicable to a digital communication network and capable of decomposing various kinds of data, e.g., audio data, video data and data for computer use, into data having a predetermined length, or cells as generally referred to, and performing switching operation on a cell basis. More particularly, the present invention relates to a control system for an output-buffer switch of the type accommodating ATM lines and switching them on the basis of a header included in a cell.

2. Description of the Related Art

Regarding a broadband ISDN (Integrated Services Digital Network), ATM is a promising transmission and switching system which implements multimedia communication combining video data, audio data, high-speed data, etc. ATM decomposes such data into cells having a predetermined bit size and performs switching and transfer on a cell basis.

In the ATM switching system, an ATM switch performs switching for routing each input ATM cell to a particular output port. In principle, the ATM switch analyzes a header added to a cell and then performs self-routing based on a hardware architecture. With the self-routing scheme based on hardware, it is likely that a plurality of cells concentrate on a single output port, resulting in contention. In light of this, it has been customary to provide the ATM switch with a buffer for dealing with contentions. ATM switches are generally classified into an output buffer switch, an input buffer switch, a cross-point buffer switch, and a shared buffer switch, depending on the location of the buffer. In the output buffer switch, buffers precede respective output ports and receive cells input via all input ports and then multiplexed; the cells are read out of each buffer at a speed matching output lines. The input buffer switch has buffers at the inlet of a switch matrix and outputs cells such that they do not conflict on an output highway. The crosspoint buffer switch has a buffer at each crosspoint of a switch matrix. Further, the shared buffer switch is so constructed as to accommodate all the input and output lines in a single cell buffer. Such four different switch configurations are outlined in FIG. 5 of the accompanying drawings.

In any one of the ATM switch arrangements stated above, the buffer size cannot be increased beyond a certain limit due to limitations regarding hardware design and production. It is a common practice to discard, depending on the concentration of traffic, cells unable to be stored in the buffer within a statistically allowable range, but at the expense of communication quality. In this respect, overflow control for reducing the cell loss probability is one of important techniques for ATM switches. The present invention relates to, among the various kinds of ATM switches, the output buffer switch and, more particularly, overflow control for this kind of switch. For details of an output buffer switch, a reference may be made to H. Suzuki et al "Output-Buffer Switch Architecture for Asynchronous Transfer Mode", International Journal of Digital and Analog Cabled System, Vol. 2, pp. 269–276, 1989.

Usually, the output-buffer switch for ATM is arranged such that when the output buffer is about to overflow, the input of cells to the entire input ports is restricted.

Even the output-buffer switch for ATM may be provided with buffers at the input port side in addition to buffers at the output port side. However, the problem with this kind of switch is that even when only one of the output buffers has overflown, all the input cells are restricted; that is, it lacks an implementation for identifying the overflow output buffer and restricting only the cells addressed thereto. This results in the head-of-line (HOL) effect at the input port side which is particular to the input buffer switch. The HOL effect refers to an occurrence that despite that the subsequent cells are not addressed to the overflown output buffer, they are stopped at the input buffer, degrading throughput to a critical degree.

Some users may desire low tariff rather than high speed transfer services, while some users may desire low speed transfer services which guarantee low cell loss probability and provides high quality communication services. To meet such demands, there is available a system capable of preventing cells for a call, to which a particular class is assigned, from being discarded by use of an exclusive buffer. However, this system is applicable only to a particular kind of cells.

SUMMARY OF THE INVENTION

It is, therefore, an object of the present invention to provide an output-buffer switch for ATM which does not discard cells when overflow is about to occur at an output buffer thereof.

An output-buffer switch for ATM of the present invention comprises a plurality of input buffer sections each for temporarily storing cells coming in through a respective input line, a time-division multiplexing section for time-division multiplexing the cells from the input buffer sections, and a plurality of output buffer sections each for temporarily storing the cells from the time-division multiplexing section which are meant for a respective output line. The output buffer sections each has a buffer occupancy ratio calculator for calculating a buffer occupancy ratio and sending a corresponding buffer occupancy state signal. The input buffer sections each has a plurality of cell buffers, and a buffer controller for distributing the incoming cells to the cell buffers in response to the buffer occupancy state signal.

The buffer occupancy ratio calculator may include means for sending the buffer occupancy state signal when the buffer occupancy ratio exceeds a predetermined threshold.

The buffer controller of each input buffer section may include control means for using only one of the cell buffers when the buffer occupancy state signal is absent.

The input buffer sections may each further include an address filter for monitoring the headers of the incoming cells. The buffer controller may include control means for storing in another cell buffer the incoming cells which should be delivered to one of the output buffer sections which has sent the buffer occupancy state signal.

The input buffer sections may each further include a buffer selector for selecting the outputs of the cell buffers and sending them to the time-division multiplexing section. The buffer controller may further include means for controlling the buffer selector.

The buffer occupancy ratio calculator may include means for calculating an occupancy ratio by buffer memory address information of the trailing cell and the leading cell stored in the buffer.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
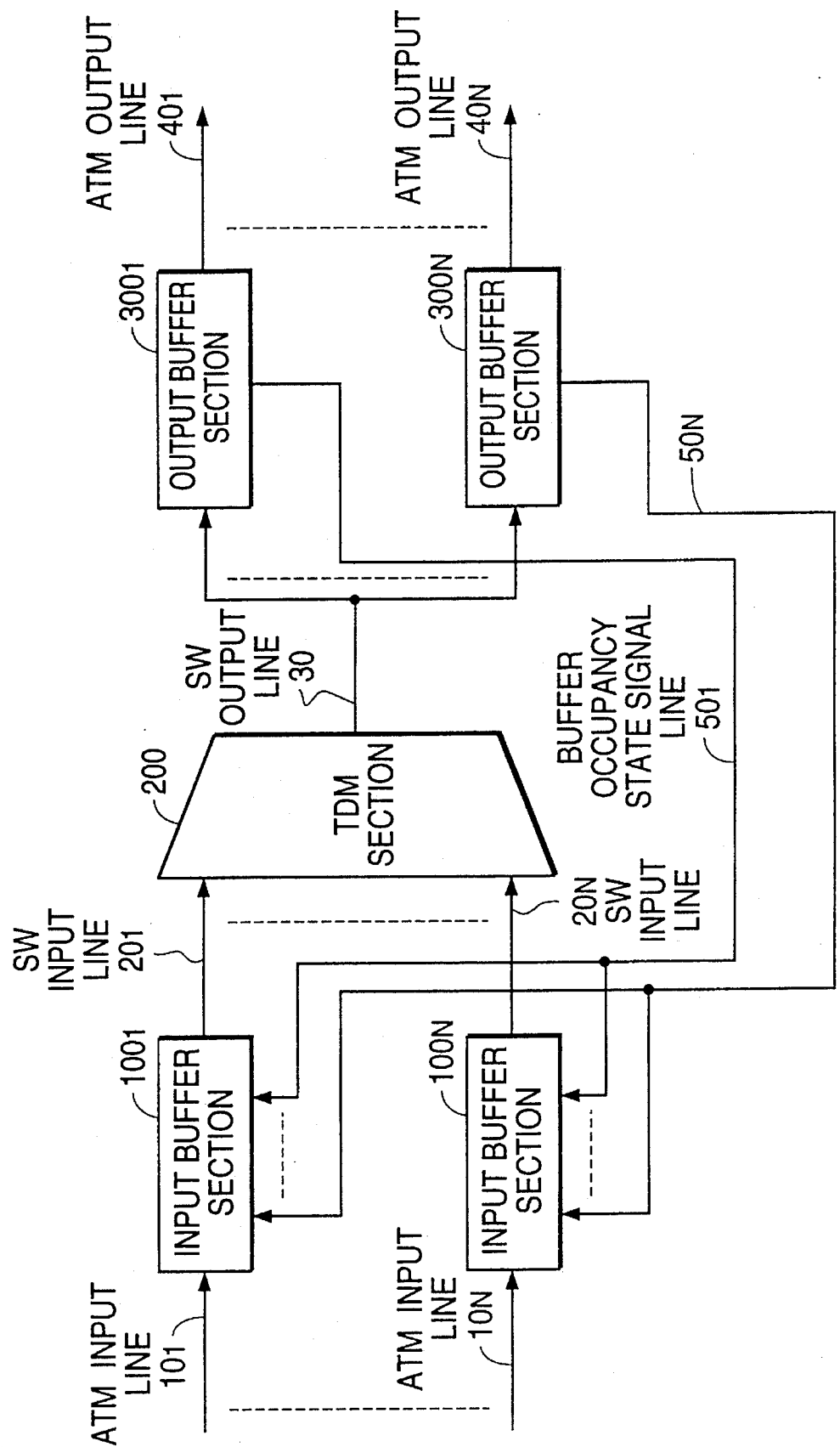
FIG. 1 is a schematic block diagram showing an output buffer switch for ATM embodying the present invention.
Figure 2:
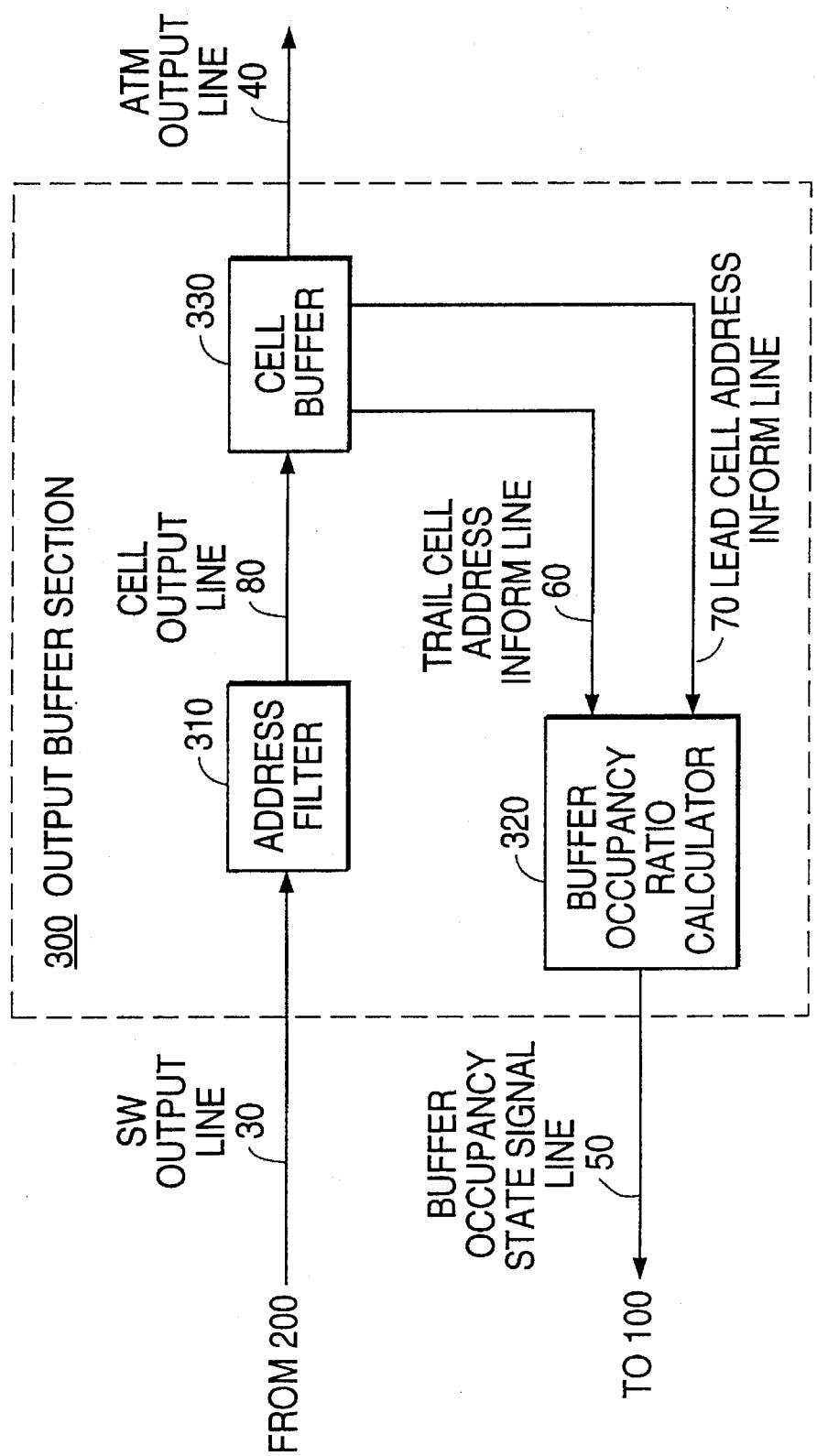
FIG. 2 is a block diagram schematically showing an output buffer section included in the embodiment.
Figure 3:
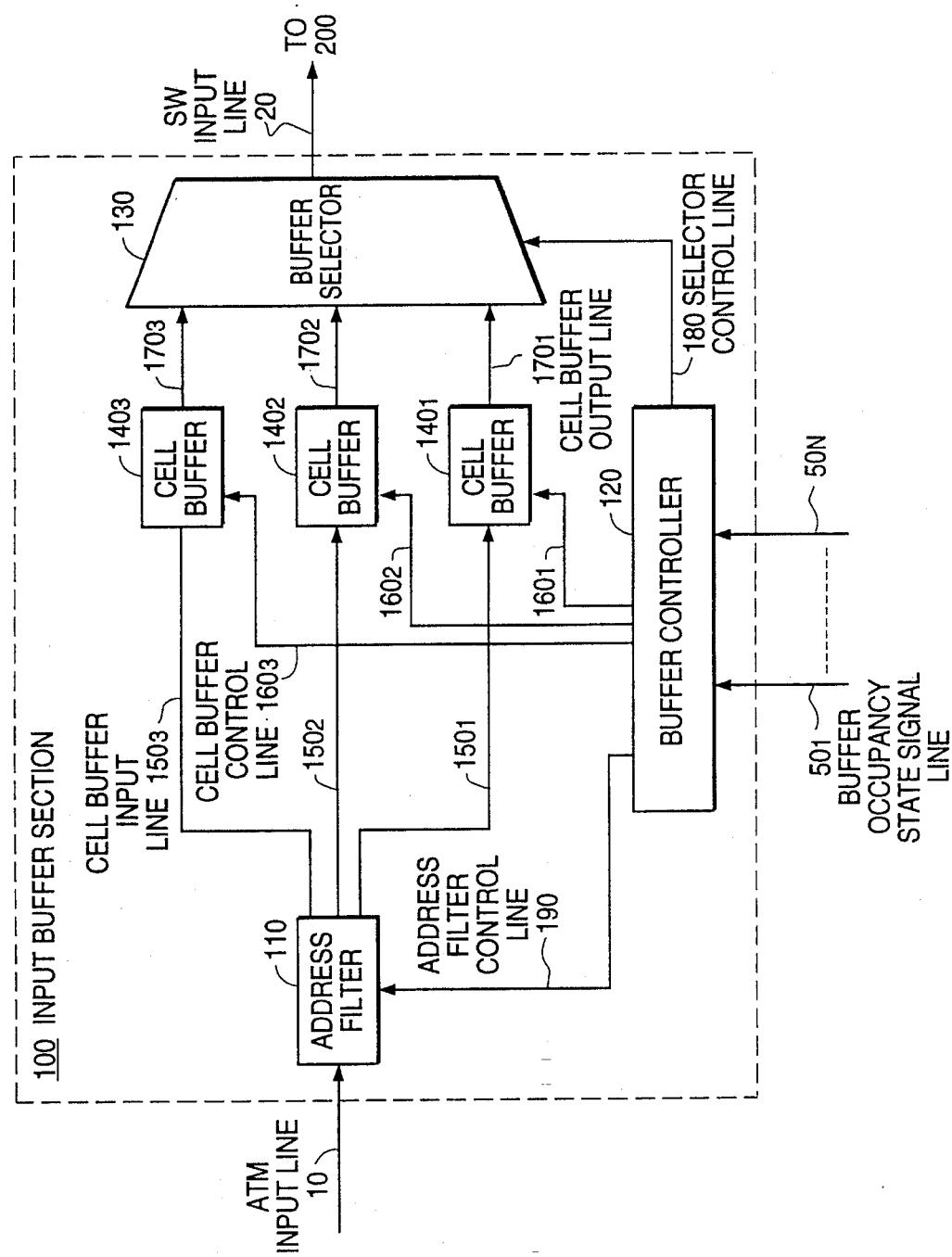
FIG. 3 is a block diagram schematically showing an input buffer section also included in the embodiment.

Referring to FIGS. 1-3, an output-buffer ATM switch embodying the present invention is shown. As shown, the output-buffer switch includes a plurality of input buffer sections $100_1$–$100_N$, a time-division multiplexing (TDM) section 200, and a plurality of output buffer sections $300_1$–$300_N$. The input buffer sections $100_1$–$100_N$ are associated one-to-one with ATM input lines $10_1$–$10_N$, and each temporarily stores cells from the associated one of the input lines $10_1$–$10_N$. The TDM section 200 time-division multiplexes the cells fed thereto from the input buffer sections $100_1$–$100_N$ via switch (SW) input lines $20_1$–$20_N$, respectively. The output buffer sections $300_1$–$300_N$ are respectively assigned to ATM output lines $40_1$–$40_N$. On receiving the cells from the TDM section 200 over a switch (SW) output line 30, the output buffer sections $300_1$–$300_N$ temporarily store them and then output them to the associated output lines $40_1$–$40_N$.

As shown in FIG. 2, each output buffer section 300 includes an output address filter 310 for selecting cells from the TDM section 200 on the basis of headers added to the individual cells. A cell buffer 330 temporarily stores the cells selected and then outputs them in conformity to the transmission rate of the ATM output line 40. The illustrative embodiment is characterized in that each output buffer section 300 further includes a buffer occupancy ratio calculator 320 for calculating an occupancy ratio of the cell buffer 330 and outputting a signal representative of the calculated ratio, i.e., a buffer occupancy state signal, to all input buffer sections when the buffer occupancy ratio has exceeded a predetermined threshold. Also, as shown in FIG. 3, the embodiment is characterized in that each input buffer section 100 includes a plurality of cell buffers $140_1$–$140_3$, and a buffer controller 120 responsive to the buffer occupancy state signal for selectively distributing input cells to the cell buffers $140_1$–$140_3$.

In each input buffer section 100, the buffer controller 120 includes control means for using, when the buffer occupancy state signal is absent, only one of the cell buffers $140_1$–$140_3$. An address filter 110 monitors the headers of input cells. The buffer controller 120 includes control means for storing the input cells to be sent to the output buffer section 300, from which the buffer occupancy state signal has been sent, in another cell buffer 140. A buffer selector 130 selects the outputs of the cell buffers $140_1$–$140_3$ and sends them to the TDM section 200. The buffer controller 120 further includes means for controlling the buffer selector 130.

The buffer occupancy ratio calculator 320 of the output buffer section 300 includes means for calculating a buffer occupancy ratio on the basis the address information of the trailing cell and the address information of the leading cell which will be delivered from the cell buffer 330, as will be described specifically later.

In operation, cells from the ATM input lines $10_1$–$10_N$ arrive at the input buffer sections $100_1$–$100_N$, respectively. The address filters 110 of the individual input buffer sections $100_1$–$100_N$ send, among the input cells, only the cells having allowed headers to the cell buffers $140_1$–$140_3$ over cell buffer input lines $150_1$–$150_1$, respectively. At this instant, when an over not reported from any one of the output buffer sections $300_1$–$300_N$, one of the cell buffers $140_1$–$140_3$ (cell buffer $140_1$ by way of example) is used; the other cell buffers will be used when overflow occurs in any of the output buffer sections. The buffer selector 130 selects the cell buffer $140_1$ which is designated by the buffer controller 120 via a buffer selection control line 180 (when an overflow is not reported from any one of the output buffer sections $300_1$–$300_N$). Then, the buffer selector 130 takes out cells from the cell buffer $140_1$ via a cell buffer output line $170_1$ and outputs them to the SW input line 20.

The TDM section 200 time-division multiplexes the cells input thereto from the input buffer sections $100_1$–$100_N$ over the SW input lines $20_1$–$20_N$, respectively. The multiplexed cells are fed from the TDM section 200 to the output buffer sections $300_1$–$300_N$ over the SW output line 30. In each of the output buffer sections $300_1$–$300_N$, the address filter 310 passes only the cells addressed thereto and transfers them to the cell buffer 330 over a cell output line 80. The cell buffer 330 writes the input cells therein while sequentially outputting cells stored therein on a first-in first-out basis. At the same time, the cell buffer 330 sends the address information of the trailing cell and that of the leading cell to the buffer occupancy ratio calculator 320 over signal lines 60 and 70, respectively. In response, the calculator 320 calculates an occupancy ratio of the cell buffer 330 and compares it with a predetermined threshold. If the calculated occupancy ratio is greater than a predetermined threshold, the calculator 320 reports such a condition to all the input buffers $100_1$–$100_N$ over a signal line 50.

Figure 4A:
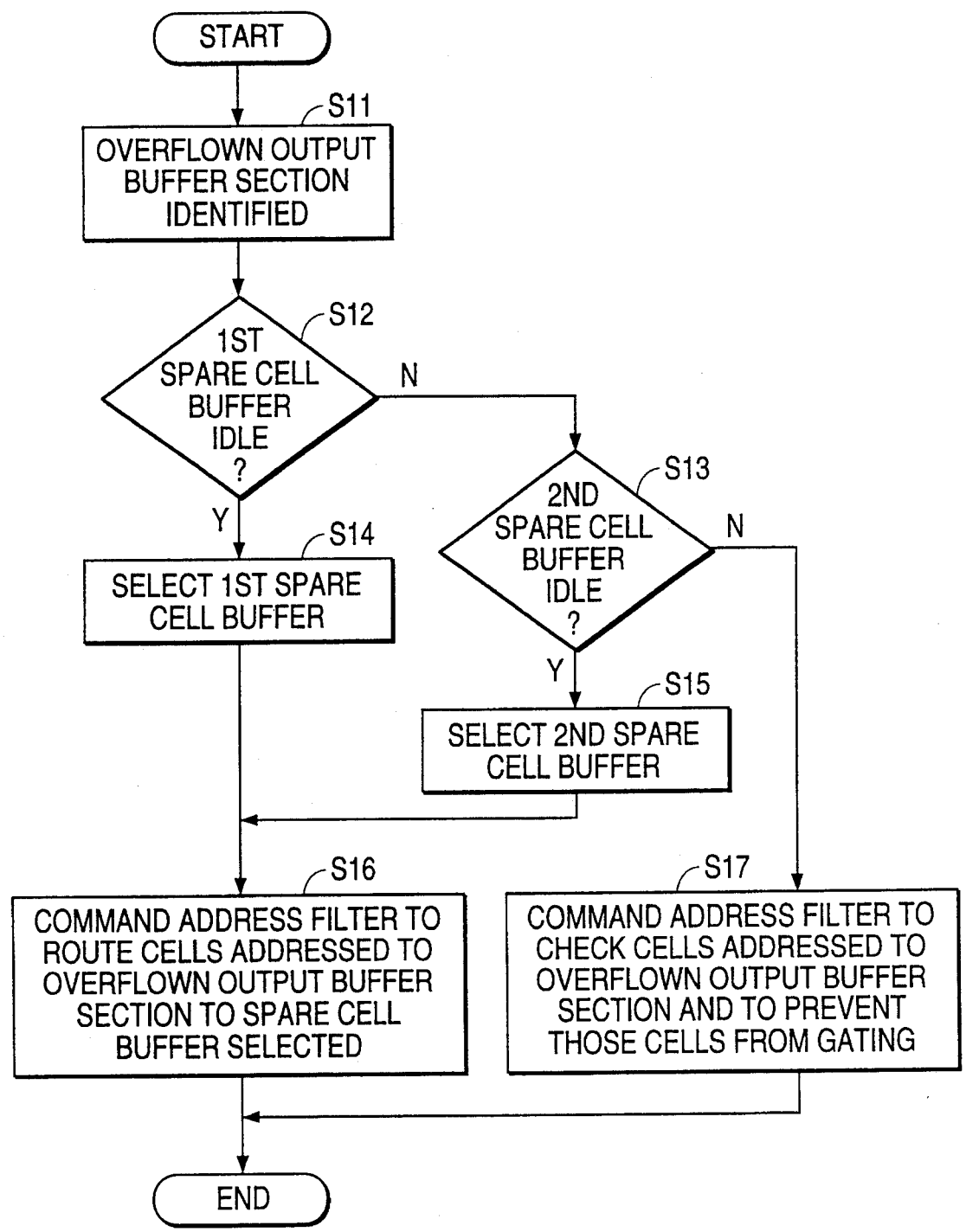
FIGS. 4(a) and 4(b) are flowcharts each showing a specific procedure to be executed by a buffer controller which is included in the input buffer section of FIG. 3.
Figure 4B:
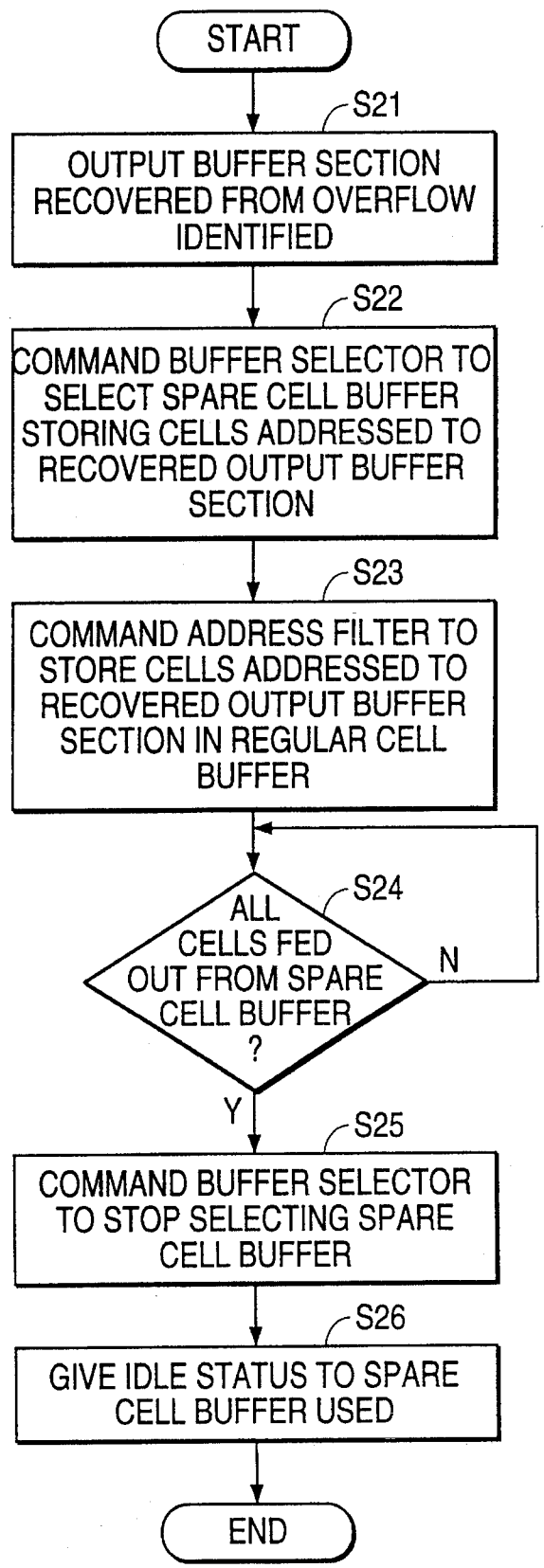
Figure 5:
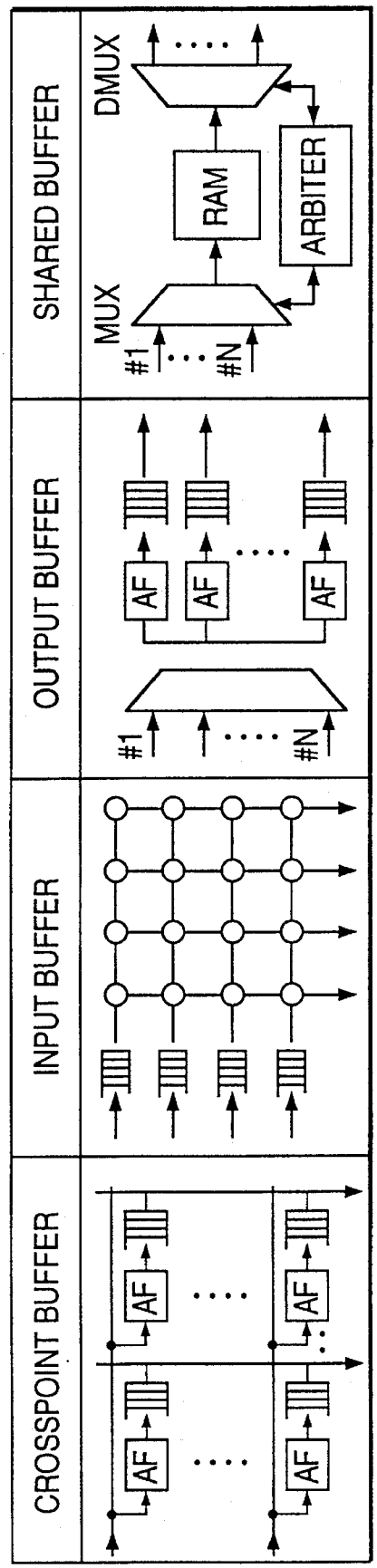
FIG. 5 outlines four different ATM switch arrangements known in the art.

A reference will be made to FIGS. 4(a) and 4(b) for describing the operation of the buffer controller 120 included in each of the input buffer sections $100_1$–$100_N$. FIG. 4(a) demonstrates a procedure which the buffer controller 120 executes on knowing that one of the output buffer sections $300_1$–$300_N$ has overflown in response to an associated one of the buffer occupancy state signal lines $50_1$–$50_N$. FIG. 4(b) shows a procedure to occur when the buffer controller 120 is informed of the recovery of the above-mentioned output buffer section from the overflow via the associated buffer occupancy state signal line.

The procedure of FIG. 4(a) begins with a step S11 in which the buffer controller 120 sees that a certain output buffer section has overflown in response to the associated buffer occupancy state signal line. Then, for the recovery of the output buffer section from the overflow, the buffer controller 120 interrupts the flow of cells into the output buffer section of interest. At the same time, the buffer controller 120 selects a spare cell buffer which is included in the input buffer section to prevent cells from being discarded. In the illustrative embodiment, the cell buffers $140_2$ and $140_3$ of each input buffer section are assumed to be spare cell buffers; the buffer controller 120 selects one of them (steps S12–S15). If both the cell buffers $140_2$ and $140_3$ are full (N, step S13), the buffer controller 120 sends a command to the address filter 110 to prevent it from gating cells addressed to the overflown output buffer section (step S17). This would cause such cells to be discarded. However, the input buffer section is provided with a number of cell buffers great enough to avoid such an occurrence.

After the selection of a spare cell buffer, the buffer controller 120 sends a command to the address filter 110 to caused it to route cells meant for the overflown output buffer section to the spare cell buffer (step S16). As a result, cells addressed to the overflown output buffer section are stored in the spare cell buffer. At this instant, the buffer controller 120 is simply sending to the buffer selector 130 a command which causes it to select the cell buffer $140_1$ used at all times. Hence, the cells meant for the overflown output buffer section are stored in the spare cell buffer, but not output therefrom. Consequently, cells existing in the output buffer section are sequentially fed out to remove the overflow.

As shown in FIG. 4(b), the buffer controller 120 identifies the output buffer section recovered from the overflow in response to an associated one of the buffer occupancy state signals $50_1$–$50_N$ (step S21). Then, the buffer controller 120 causes the buffer selector 130 to select the spare cell buffer as well in order to output the cells stored therein, i.e., the cells addressed to the recovered output buffer section (step S22). Further, the buffer controller 120 commands the address filter 110 to route incoming cells meant for the recovered output buffer section to the regular cell buffer $140_1$ (step S23).

When all the cells are output from the spare cell buffer (Y, step S24), the buffer controller 120 causes the buffer selector 130 to stop selecting the spare cell buffer (step S25), gives an idle status to the spare cell buffer having been used (step S26), and then ends the procedure.

As stated above, since each spare cell buffer simply receives and stores cells until the overflown output buffer section becomes idle, the buffer capacity is selected such that the cell buffers do not overflow in such a range.

In summary, it will be seen that the present invention provides an output-buffer switch capable of allowing, when overflow occurs at an output buffer, the output buffer from recovering from the overflow immediately without discarding incoming cells.

Various modifications will become possible for those skilled in the art after receiving the teachings of the present disclosure without departing from the scope thereof.

What is claimed is:

1. An output-buffer switch for an asynchronous transfer mode, comprising:

a plurality of input buffer sections each for temporarily storing cells coming in through a respective input line;

a time-division multiplexing section for time-division multiplexing the cells from said plurality of input buffer sections; and a plurality of output buffer sections each for temporarily storing the cells from said time-division multiplexing section which are meant for a respective output line;

said plurality of output buffer sections each comprising
   a buffer for temporarily storing the cells to be outputted to the respective output line; and
   a buffer occupancy ratio calculator for monitoring a trailing cell address information and a leading cell address information in said buffer, for calculating an occupancy ratio of said buffer on a basis of said trailing cell address information and said leading cell address information, and for sending a buffer occupancy state signal to said plurality of input buffer sections in accordance with a result of said calculation;

said plurality of input buffer sections each comprising a plurality of cell buffers, and a buffer controller for distributing the incoming cells to said plurality of cell buffers in response to said buffer occupancy state signal.

2. A switch as claimed in claim 1, wherein said buffer occupancy ratio calculator comprises means for sending said buffer occupancy state signal only when the buffer occupancy ratio exceeds a predetermined threshold.

3. A switch as claimed in claim 2, wherein said buffer controller of each of said input buffer sections comprises control means for using only one of said plurality of cell buffers when said buffer occupancy state signal is absent.

4. A switch as claimed in claim 3, wherein said input buffer sections each further comprises an address filter for monitoring headers of the incoming cells and delivering only the cells having allowed headers to be routed to one of said plurality of cell buffer sections, said buffer controller comprising a second control means for interrupting the incoming cells having the headers for routing to one of said output buffer sections from which said buffer occupancy state signal has been sent, and switching to another one of said plurality of cell buffer sections for storing the incoming cells.

5. A switch as claimed in claim 4, wherein said input buffer sections each further comprises a buffer selector for selecting outputs of said plurality of cell buffers and sending said outputs to said time-division multiplexing section, said buffer controller further comprising a third control means for controlling said buffer selector to select one of said plurality of cell buffer sections based on said buffer occupancy state signal.

* * * * *